(12) United States Patent  (10) Patent No.: US 9,336,376 B2
Sun et al.  (45) Date of Patent: May 10, 2016

(54) MULTI-TOUCH METHODS AND DEVICES

(71) Applicant: INDUSTRIAL TECHNOLOGY RESEARCH INSTITUTE, Hsin-Chu (TW)

(72) Inventors: Hung-Min Sun, Hsinchu (TW); Shiuan-Tung Chen, New Taipei (TW); Ming-Sheng Yeh, Hsinchu (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 287 days.

(21) Appl. No.: 14/081,855

(22) Filed: Nov. 15, 2013

(65) Prior Publication Data

US 2014/0317415 A1  Oct. 23, 2014

(30) Foreign Application Priority Data

Apr. 19, 2013  (TW) .............................. 102113985 U

(51) Int. Cl.
  *G06F 21/83*  (2013.01)
  *G06F 21/36*  (2013.01)
  *G06F 21/62*  (2013.01)

(52) U.S. Cl.
  CPC ............ *G06F 21/36* (2013.01); *G06F 21/6209* (2013.01); *G06F 21/83* (2013.01); *G06F 2221/2147* (2013.01)

(58) Field of Classification Search
  CPC ................ G06F 21/6209; G06F 21/83; G06F 2221/2147
  USPC ........................................................ 713/183
  See application file for complete search history.

(56) References Cited

U.S. PATENT DOCUMENTS

| 7,286,063 | B2 | 10/2007 | Gauthey et al. |
| 7,574,739 | B2 | 8/2009 | Shirakawa |
| 7,593,000 | B1 | 9/2009 | Chin |
| 2005/0127158 | A1 | 6/2005 | Figueras et al. |
| 2008/0244272 | A1 | 10/2008 | Hsieh et al. |
| 2009/0051648 | A1 | 2/2009 | Shamaie et al. |
| 2010/0031344 | A1 | 2/2010 | Zhao et al. |
| 2010/0180336 | A1* | 7/2010 | Jones .................... H04L 9/3226 726/19 |
| 2011/0156867 | A1 | 6/2011 | Carrizo et al. |
| 2011/0159850 | A1 | 6/2011 | Faith et al. |

(Continued)

FOREIGN PATENT DOCUMENTS

CN   102244699 A   11/2011
CN   103034798 A   4/2013

(Continued)

OTHER PUBLICATIONS

Roman Weiss et al., PassShapes—Utilizing Stroke Based Authentication to Increase Password Memorability, Proceedings: NordiCHI, 2008, p. 383-392.

(Continued)

*Primary Examiner* — Ellen Tran
(74) *Attorney, Agent, or Firm* — Locke Lord LLP; Tim Tingkang Xia, Esq.

(57) ABSTRACT

The present disclosure relates to a multi-touch method, configured to a touch panel. The method comprises: applying a first object to touch a first image on the touch panel for inputting a first password; and determining whether inputting a second password, and if not, removing the first object from the touch panel for ending a first round of password input.

12 Claims, 8 Drawing Sheets

(56) References Cited

U.S. PATENT DOCUMENTS

| | | |
|---|---|---|
| 2011/0283241 A1 | 11/2011 | Miller et al. |
| 2011/0296356 A1 | 12/2011 | Chaudhri et al. |
| 2012/0109997 A1 | 5/2012 | Sparks et al. |
| 2012/0124177 A1 | 5/2012 | Sparks |
| 2012/0126941 A1* | 5/2012 | Coggill .................. G06F 21/36 340/5.54 |

FOREIGN PATENT DOCUMENTS

| | | |
|---|---|---|
| TW | 200805902 A | 1/2008 |
| TW | I333157 B | 11/2010 |
| TW | I334559 B | 12/2010 |
| TW | 201137658 A | 11/2011 |
| TW | 201140368 A | 11/2011 |
| TW | I360071 B | 3/2012 |
| TW | 201315195 A | 4/2013 |
| WO | 2004070543 A3 | 8/2004 |

OTHER PUBLICATIONS

Intellectual Property Office, Ministry of Economic Affairs, R.O.C., "Office Action", May 5, 2015, Taiwan.

* cited by examiner

MULTI-TOUCH METHODS AND DEVICES

CROSS REFERENCE TO RELATED APPLICATION

This application also claims priority to Taiwan Patent Application No. 102113985 filed in the Taiwan Patent Office on Apr. 19, 2013, the entire content of which is incorporated herein by reference.

TECHNICAL FIELD

The present disclosure relates to a multi-touch method that is configured for encrypting and decrypting a touch panel.

BACKGROUND

In this era of information explosion, there are a variety of media available for communication and data transmission in addition to those conventional tools, such as mail and telephone. Among which, the Internet is becoming more and more important for nearly everybody as it is considered one of the newest and most forward-looking media and surely "the medium of the future". Nowadays, people are used to communicate or making transaction on Internet, which includes the activities of online ticket purchasing, e-mail transaction, and social network blogging. However, there could be plenty of sensitive information, such as personal data and business confidentials, being exchanged through the Internet in those activities, thereby enabling any person with malicious intent to have access to that sensitive information on Internet by any means. Consequently, there are a variety of security mechanisms being developed for protecting users from losing private and sensitive information to hacker attacks, such as a PIN-login system.

Generally, the pin for most web services using PIN-login system is composed of a pure string of numbers or English characters, which are to be inputted sequentially by a specific order as a password for authentication. However, such simple password may not be very effective in resisting attacker using either brute-force attacks or dictionary attack, since a hacker could easily program a computer to automatically and systematically generate and check all possible pin combinations until the correct combination is found. Such methods may be very time consuming but are still reasonably feasible.

The most common way to deal with brute-force attacks is by setting a restriction to the amount of error that a user is allowed to make for logging into a web service. However, although it could effectively prevent the brute-force attacks, the foregoing method also could cause certain inconveniences to a real user, especially when the user forgets his/her password, causing the user's account to be disabled during the try-and-error process. In addition, another way to deal with brute-force attacks is by increasing the amount of possible combinations required to be checked in a brute-force attack and thereby increase the time consumed before the correct password is found. Nevertheless, the increasing of possible combinations not only could be achieved by expanding the key length of the password, but also could be achieved by allowing symbols other than numbers and English characters to be used in the password string. However, asking users to remember a password consisting of a "mix of various symbols and characters" is similar to asking them to remember a sequence of bits, which is hard to remember, and only a little bit harder to crack. Therefore, users generally tend to use one simple password for all their registered web services without having the password to be changed regularly, and even design the password according to his/her personal information, such as birthday or personal ID number. By doing so, the user's privacy and property security are still endangered by hacker attack even when the amount of possible combinations for password checking had been increased exponentially.

SUMMARY

In one exemplary embodiment, the present disclosure provides a multi-touch method, configured to a touch panel, which comprises the steps of: applying a first object to touch a first image on the touch panel for inputting a first password; and determining whether or not to touch and select a second image on the touch panel, if not, removing the first object from the touch panel for ending a first round of a password input process while enabling a password confirmation process to be proceeded.

In another exemplary embodiment, the present disclosure provides a multi-touch method, configured to a touch panel, which comprises the steps of: applying a first object to touch a first image on the touch panel for inputting a first password in a first round of a password input process; and determining whether to input a second password in a second round of the password input process, and if not, removing the first object from the touch panel for ending the first round of the password input process while enabling an authentication process to be proceeded.

In further another exemplary embodiment, the present disclosure provides a multi-touch device, which comprises: a touch panel, having a plurality of images displayed thereon; and a process unit, coupled to the touch panel for executing an encryption process and a decryption process.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
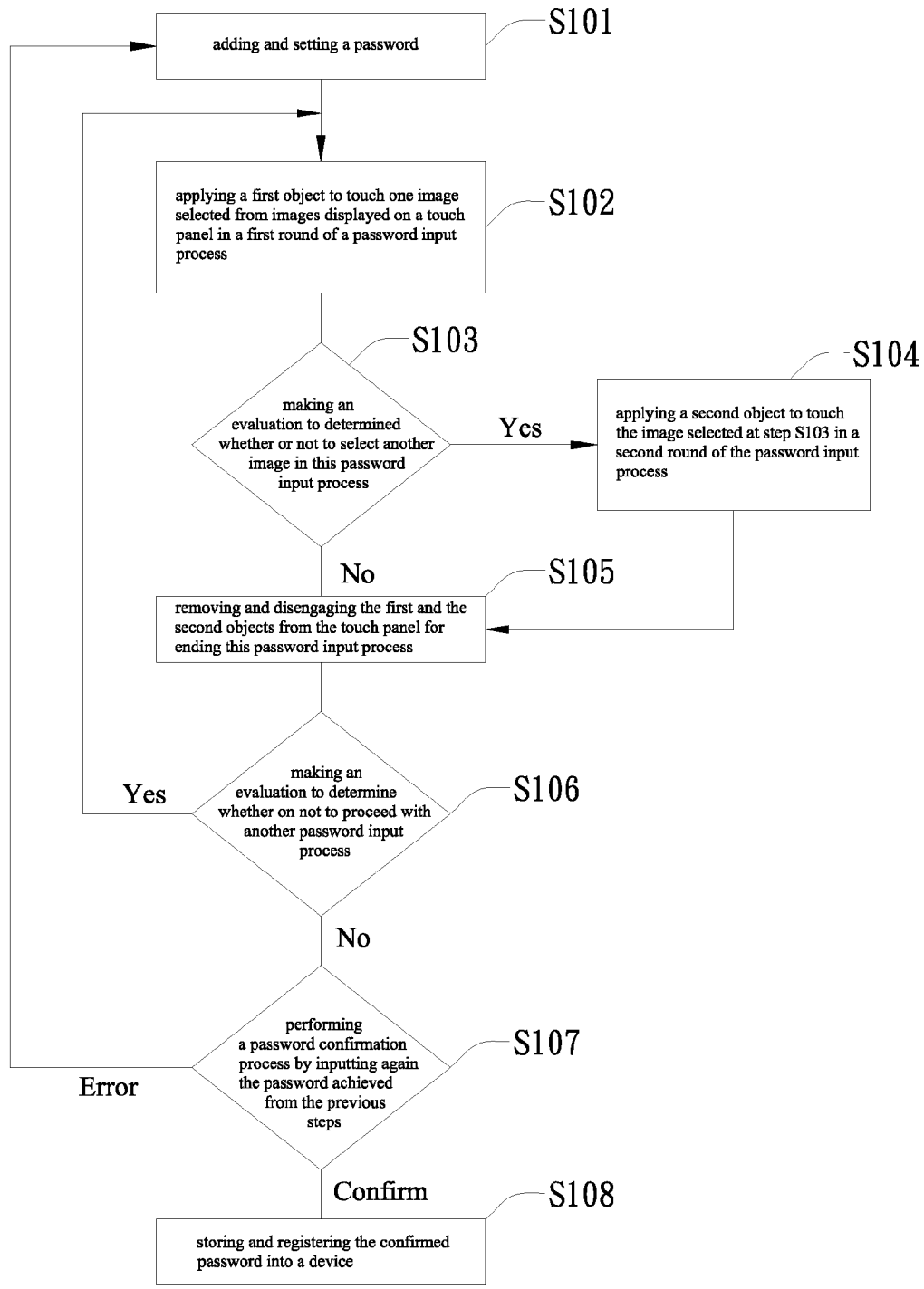
FIG. 1 is a flow chart depicting steps performed in a multi-touch method according to an embodiment of the present disclosure that is configured for a touch panel to be used for adding and setting a password.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a flow chart depicting steps performed in a multi-touch method according to an embodiment of the present disclosure that is configured for a touch panel to be used for adding and setting a password. It is noted that the multi-touch method could be used in an encryption process for establish a password for a device. As shown in FIG. 1, the flow starts from the step S101. At step S101, a password setting is enabled on a device for allowing a user to add a new password to the device, and then the flow proceeds to step S102. At step S102, a first object is applied to touch a first image displayed on the touch panel for inputting a first password in a first round of a password input process; and then the flow proceeds to step S103. At step S103, an evaluation is made for determining whether or not to enable a second image on the touch panel to be touched, and if not, the flow proceeds to step S105, otherwise, the flow proceeds to step S104. At step 104, when it is determined to have the second image to be touched, the first object is kept to engage with the touch panel while enabling a second round of the password input process to be proceeded for applying a second object to touch the second image on the touch panel for inputting a second password, and then the flow proceeds to step S105. At step S105, the first object and/or the second object are/is removed from the touch panel so as to end the password input process; and then the flow proceeds to step S106. It is noted that, in the step S105, the second object could be removed from the touch panel before or after the removing of the first object, or in an embodiment, the first object and the second object could be removed from the touch panel simultaneously. Thereby, the first and the second passwords obtained respectively from the first and the second rounds of the password input process are combined into a password combination.

At step S106, an evaluation is made for determining whether or not to proceed with another password input process after the password input process, and if so, the flow proceeds back to step S102 for applying the first object again to touch the first image, otherwise, the flow proceeds to step S107. At step S107, a password confirmation process is enabled by inputting again the password combination achieved from the first and the second rounds of the password input process, and if the password confirmation process passes, i.e. the password combination inputted in step S107 conforms to the password combination achieved from the first and the second rounds of the password input process, the flow proceeds to step 108, otherwise, the password confirmation process fails and thus the flow proceeds back to S101. At step S108, the password combination is stored and registered into a device, such as a mobile phone. It is noted that each of the first object and the second object could be a finger or a touch pen, and each of the first and the second images comprises characters, numbers, or figures.

In this embodiment, the storing and registering of the established password combination is enabled according to a storage algorithm. It is noted that for those passwords inputted using multi-touch methods, different figures or characters in the same password combination could be inputted in any order at will, i.e. they are not required to be inputted one after another according to a specific order. Therefore, a specific storage algorithm without sorting order is required. In this disclosure, each pin selected in each round of a password input process is stored and registered in a bitwise manner, whereas each pin is converted to a 32-bit integer on a bit-by-bit basis. Taking a numerical password for instance, the digits 0~9 are used for representing the bit positions from left to right in a 32-bit integer, and the bit whose corresponding number is selected is registered as "1", and on the other hand, the bit whose corresponding number is not selected is registered as "0". For example, when the numbers "3" and "5" are selected, the third and the fifth bits is registered as "1", while allowing all the other bits to be "0", as shown in the Table 1 hereinafter.

TABLE 1

| bit31 | bit30 | bit29 | ... | bit6 | bit5 | bit4 | bit3 | bit2 | bit1 | bit0 |
|---|---|---|---|---|---|---|---|---|---|---|
| 0 | 0 | 0 | ... | 0 | 1 | 0 | 1 | 0 | 0 | 0 |

As shown in Table 1, the number "00000000000000000000000000101000" of a binary system could be converted into a number "40" of a decimal system, so that the pins selected in this round of password input process could be stored in a storage device in a form of number "40". Moreover, when a password is selected to be composed of four pins, four 32-bit integers are required for storing such password. Similarly, if a password is composed of symbols and figures, each of such symbols and figures could first be define to correspond and map to a specific number, which could be ranged between 0 to 31 in a 32-bit integer space in a one-on-one manner. However, if there are more than 32 pins in a password, it is always possible to use more than one 32-bit integer for storing such password and thus there is never a problem that a password is too large to be stored. Consequently, it could be relative easy in password authentication and confirmation, as the authentication or confirmation could be passed when a password combination currently inputted is compared and conformed to a password combination previously registered; otherwise, the authentication or confirmation is determined to be failed.

Figure 2:
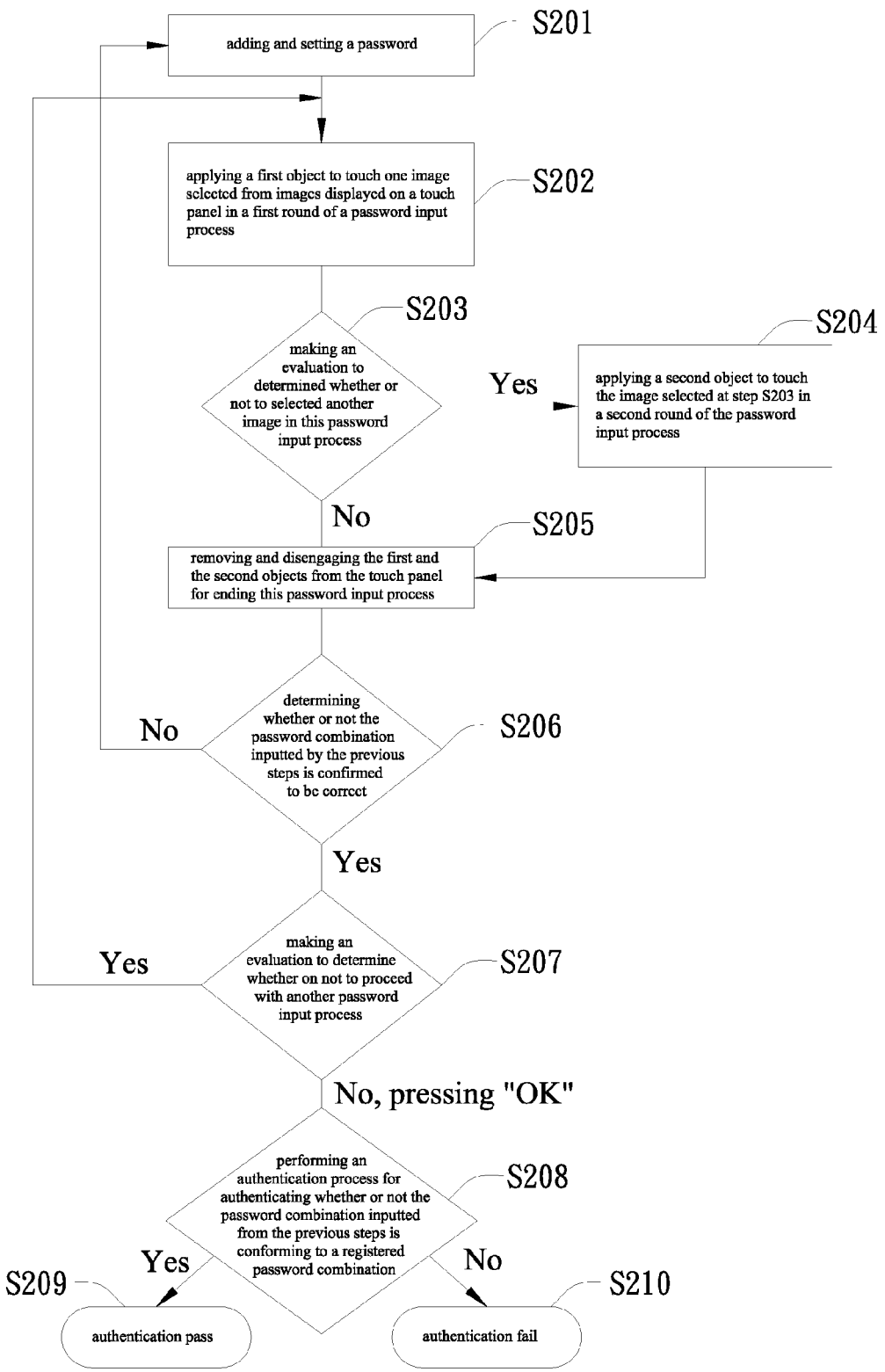
FIG. 2 is a flow chart depicting steps performed in a multi-touch method according to an embodiment of the present disclosure that is configured for a touch panel to be used for password authentication.

Please refer to FIG. 2, which is a flow chart depicting steps performed in a multi-touch method according to an embodiment of the present disclosure that is configured for a touch panel to be used for password authentication. It is noted that the multi-touch method could be used in a decryption process for authenticating a password for a device. As shown in FIG. 2, the flow starts from step S201. At step S201, a password inputting is enabled on a device for allowing a user to input a password to the device, and then the flow proceeds to step S202. At step S202, a first object is applied to touch a first image displayed on the touch panel for inputting a first password in a first round of a password input process; and then the flow proceeds to step S203. At step S203, an evaluation is made for determining whether or not to enable a second image on the touch panel to be touched, and if not, the flow proceeds to step S205, otherwise, the flow proceeds to step S204. At step 204, when it is determined to have the second image to be touched, the first object is kept to engage with the touch panel while enabling a second round of the password input process to be proceeded for applying a second object to touch the second image on the touch panel for inputting a second password, and then the flow proceeds to step S205. At step S205, the first object and/or the second object are/is removed from the touch panel so as to end the password input process; and then the flow proceeds to step S206. It is noted that, in the step S105, the second object could be removed from the touch panel before or after the removing of the first object, or in an embodiment, the first object and the second object could be removed from the touch panel simultaneously. Thereby, the first and the second passwords obtained respectively from the first and the second rounds of the password input process is combined into a password combination.

At step S206, an evaluation is made for determining whether or not the password combination inputted by the previous steps is confirmed to be correct, and if not, the flow proceeds back to step S201, otherwise, the flow proceeds to step S207. At step S207, an evaluation is made to determine whether or not to proceed with another password input process, and if so, the flow proceeds back to step S202, otherwise, the flow proceeds to step S208. At step S208, an authentication process is enabled for authenticating whether or not the password combination inputted from the previous steps is conforming to a registered password combination, and if so, the flow proceeds to step S209, otherwise, the flow proceeds to step S210. At step S209, the authentication process is passed. At step s210, the authentication process is failed. Similarly, each of the first object and the second object could be a finger or a touch pen, and each of the first and the second images comprises characters, numbers, or figures.

Generally, for a user to establish a password combination on a device using the method shown in FIG. 1, it is common to set a restriction to the number of round required for each password input process as well as to the password length in each round so as to ensure the password combination to have sufficient password strength. In an embodiment of the present disclosure, there could be at least three rounds in one password input process, or the password should contain at least four digits. It is because that without restriction, a user tends to use simple passwords for it is easy to memorized and simple to input so as to process the corresponding authentication processes rapidly and correctly. However, such simple password with weak password strength may not be very effective in resisting attacker using either brute-force attacks or dictionary attack.

Figure 3A:
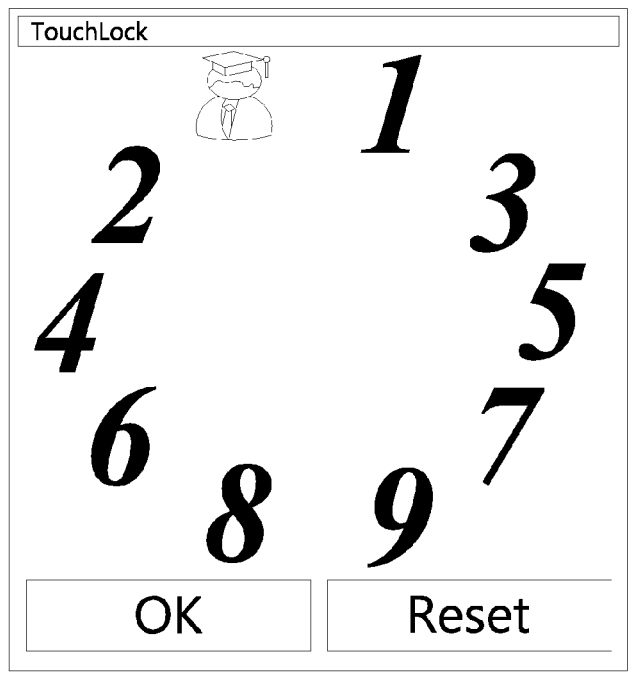
FIGS. 3A-3C and FIGS. 4A-4B show various embodiments of the present disclosure.
Figure 3B:
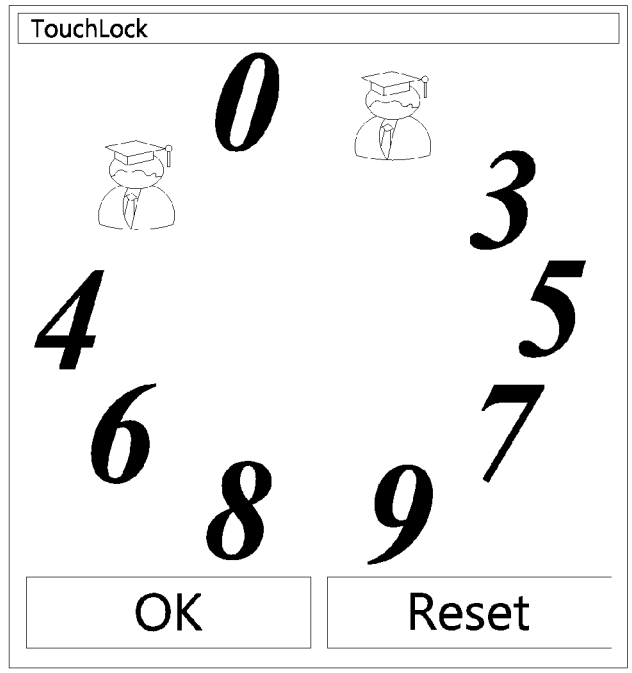
Figure 3C:
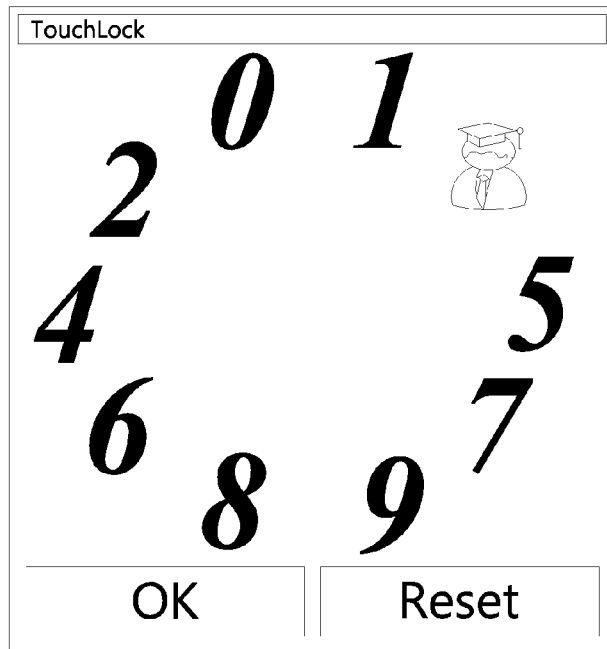
Figure 4A:
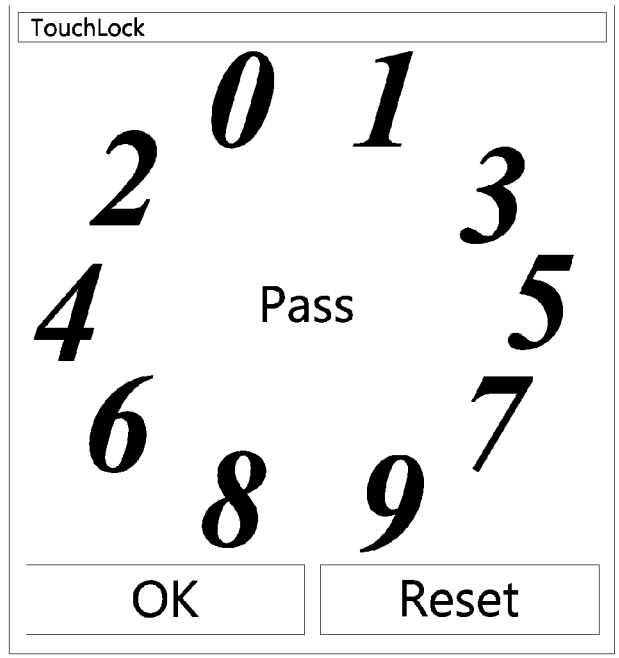
Figure 4B:
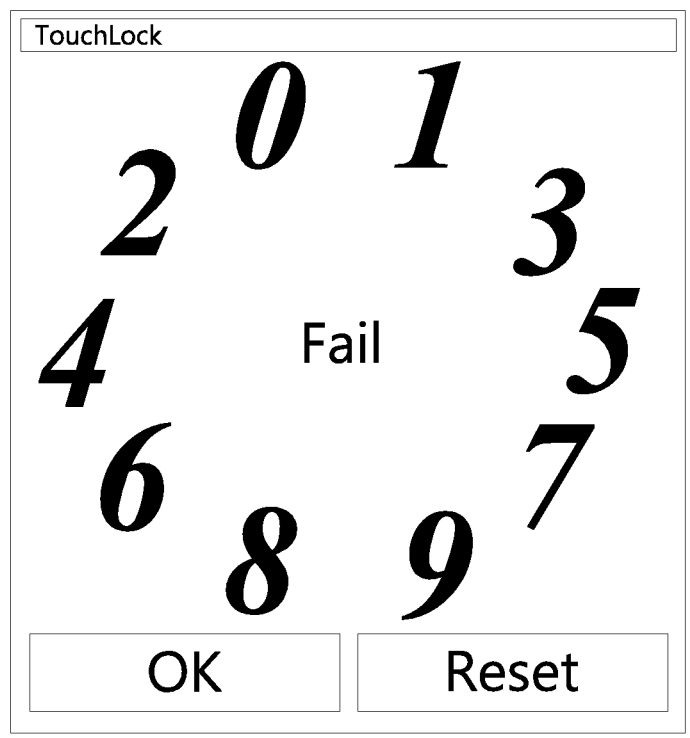

Please refer to FIGS. 3A-3C and FIGS. 4A-4B, which are diagrams showing various embodiments of the present disclosure. In a condition when a password combination set by a user is {0}, {1, 2}, {3}, the password input process will be composed of three rounds of password inputting. As shown in FIG. 3A, the digit "0" is touched first in the first round. After the first round, the digits "1" and "2" are touched either simultaneously without specific ordering in the second round, as shown in FIG. 3B. It is noted that the digits "1" and "2" should never be touched one after another, e.g. the digit "1" is pressed and released, and after releasing the digit "1", the digit "2" is pressed, or vice versa, since such manner is treated as two different rounds of password inputting for forming a password combination of {1}, {2} instead of {1, 2}. After the second round, the digits "3" is touched, as shown in FIG. 3C. Thereafter, a password authentication process could be enabled after the three rounds of password inputting is completed, which is performed similarly to the aforesaid password confirmation process, but without requiring the password combination to be inputted twice. In this embodiment, the password combination {0}, {1, 2}, {3} or another password combination {0}, {2, 1}, {3} is correct to pass the authentication process, as shown in FIG. 4A. However, all the other password combinations different from the aforesaid two password combinations will not pass the authentication process, as shown in FIG. 4B.

Figure 5A:
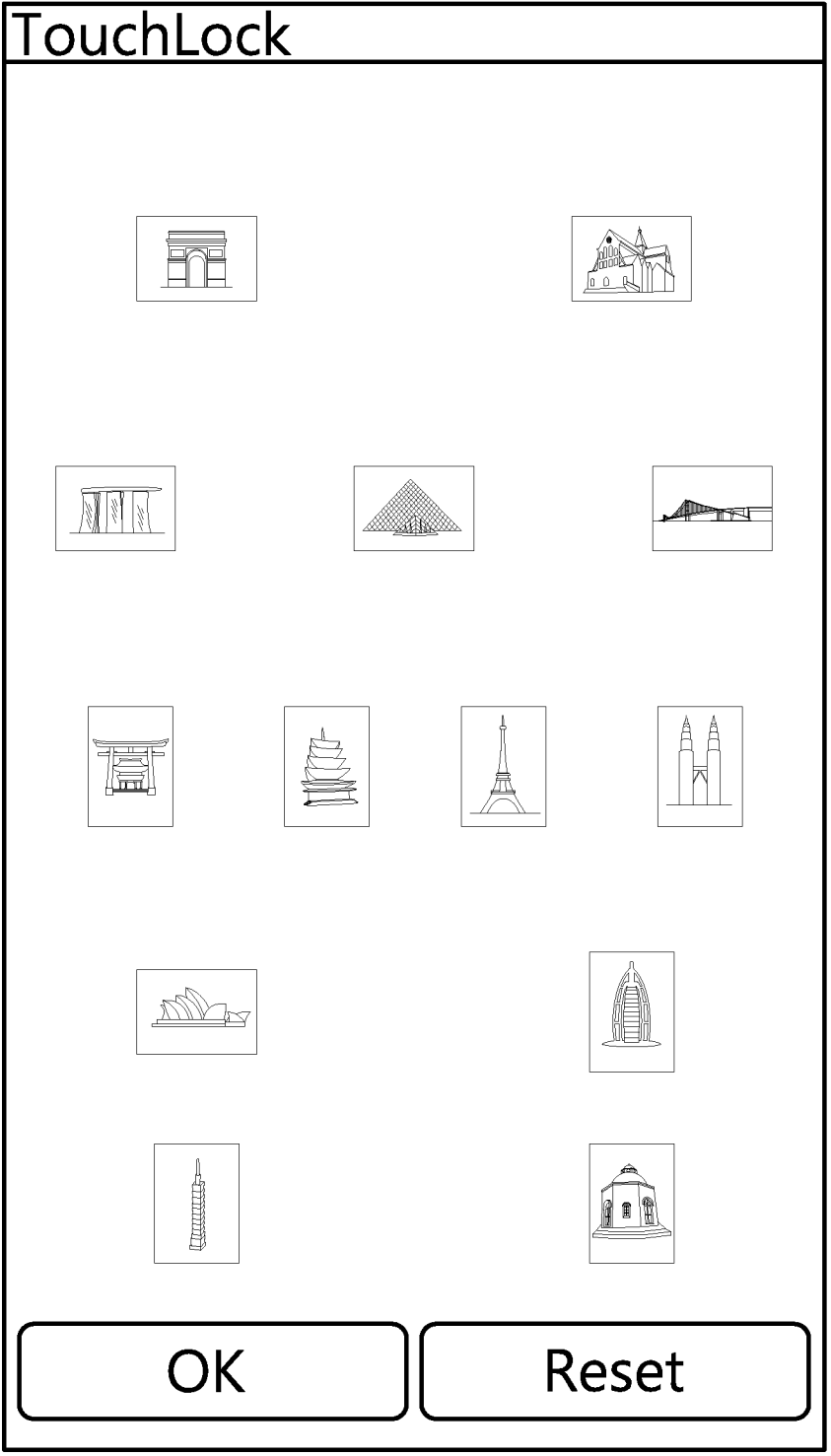
FIG. 5A and FIG. 5B are schematic diagrams showing an embodiment of the present disclosure that use pictures instead of numbers.
Figure 5B:

Please refer to FIG. 5A and FIG. 5B, which are schematic diagrams showing an embodiment of the present disclosure that use pictures instead of numbers. By arranged the figures of FIG. 5A to correspond to the bit positions shown in FIG. 5B, the embodiment using password composed of figures of FIG. 5A could be operated in a way the same as the embodiment shown in FIG. 3A~3C and FIG. 4A~4B, and thus will not be described further herein.

Figure 6:
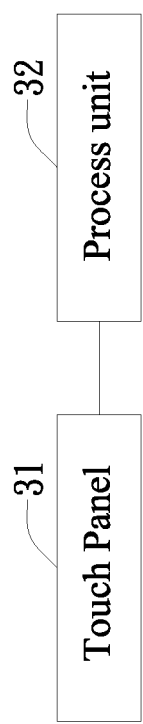
FIG. 6 is a schematic diagram showing a multi-touch device according to an embodiment of the present disclosure.

Please refer to FIG. 6, which is a schematic diagram showing a multi-touch device according to an embodiment of the present disclosure. As shown in FIG. 6, the multi-touch device comprises: a touch panel 31 and a process unit 32 that is coupled to the touch panel for executing an encryption process and a decryption process. During the executing of the encryption process by a user, a first object is applied to touch a first image displayed on the touch panel 31 for inputting a first password while simultaneously enabling the process unit 32 to make an evaluation to determine whether or not to enable a second image on the touch panel to be touched, and if not, removing the first object from the touch panel for ending a first round of a password input process. However, when it is determined to have the second image to be touched, the first object is kept to engage with the touch panel 31 while enabling a second round of the password input process to be proceeded for applying a second object to touch the second image on the touch panel 31 for inputting a second password in a second round of the password input process. After ending the second round of the password input process, the first and the second passwords obtained respectively from the first and the second rounds of the password input process are combined into a password combination, whereas each of the first and the second images comprises characters, numbers, or figures. Thereafter, the process unit 32 is enable by the user to make another evaluation to determine whether or not to proceed with another password input process, and if not, the process unit is enabled to perform a password confirmation process for confirming the password combination while allowing the process unit 32 to store and register the password combination according to a storage algorithm when the password combination is confirmed to be correct.

In addition, during the executing of the decryption process by a user, a first object is applied to touch a first image displayed on the touch panel 31 for inputting a first password while simultaneously making an evaluation to determine whether or not to enable a second image on the touch panel 31 to be touched, and if not, removing the first object from the touch panel 31 for ending a first round of a password input process. However, when it is determined to have the second image to be touched, the first object is kept to engage with the touch panel 31 while enabling a second round of the password input process to be proceeded for applying a second object to touch the second image on the touch panel 31 for inputting a second password in a second round of the password input process. After ending the second round of the password input process, the first and the second passwords obtained respectively from the first and the second rounds of the password input process are combined into a password combination, whereas each of the first and the second images comprises characters, numbers, or figures. Thereafter, the process unit 32 is enable to perform an authentication process on the password combination for authenticating and checking whether the password combination is conformed to a registered password combination stored in the multi-touch device, and if so, the password combination is determined to be correct and passes the authentication process for allowing the user to successfully log into the multi-touch device.

To sum up, the multi-touch methods provided in the present disclosure increases the amount of possible password combinations for a multi-touch device using existing pin symbols that are already familiar to its users, without having the users to use another new pin symbols that may be difficult to memorize. Taking a device supporting two-point touch for example, when the device is configured to be set with a password combination with four-digit number, e.g. 9876, and thus there could be five different ways of different amount of rounds to be used for setting such password combination, as following:

(1) 9 8 7 6: four rounds whereas there is one digit to be inputted in each round.
(2) 98 7 6: three rounds whereas there are two digits to be inputted in the first round and one digit only in each of the other rounds.
(3) 9 87 6: three rounds whereas there are two digits to be inputted in the second round and one digit only in each of the other rounds.
(4) 9 8 76: three rounds whereas there are two digits to be inputted in the third round and one digit only in each of the other rounds.
(5) 98 76: two rounds whereas there are two digits to be inputted in each round.

It is noted that any conventional password input method is performed in a way similar to the foregoing first way (1). On the other hand, by only enabling a two-point touch, there are four additional password combinations available, as indicated in (2), (3), (4) and (5). Thus, it is clear that the multi-touch methods provided in the present disclosure could increase the amount of possible password combinations for a multi-touch device using only existing pin symbols that are already familiar to its users, without having the users to use another new pin symbols.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A multi-touch method of password entry, configured on a touch panel, comprising the steps of:
    setting a plurality rounds of password entry, each of the plurality of rounds of password entry comprising:
        providing, by the touch panel, a first image and a second image;
        determining, by the touch panel, a first object is touching the first image on the touch panel;
        determining, by the touch panel, whether or not a second object is touching the second image on the touch panel when the first object is touching the first image,
        if the touch panel determines that the second object is touching the second image when the first object is touching the first image, when the first object and the second object are removed from the touch panel, using the first image and the second image as the password entry of that round of password entry and ending that round of password entry;
        if the touch panel determines that the second object is not touching the second image when the first object is touching the first image, when the first object is removed from the touch panel, using the first image as the password entry of that round of password entry; and
        ending that round of password entry and proceeding to the next round of the plurality rounds of entry;
    performing each of the plurality rounds of password entry;
    after completing the plurality rounds of password entry, combining password entries from each of the plurality rounds of password entry, to form a complete password entry; and
    performing a password authentication process on the complete password entry.

2. The multi-touch method of claim 1, further comprising a step of, after the first object and the second object are removed from the touch panel, or after the first object is removed from the touch panel:
    making an evaluation to determine whether or not to proceed with another password entry process for that round of password entry, if not, performing the password confirmation process for confirming that round of password entry.

3. The multi-touch method of claim 2, wherein when that round of password entry is confirmed to be correct, that round of password entry is stored and registered, otherwise, that round of password entry is to be inputted again.

4. The multi-touch method of claim 2, wherein that round of password entry achieved is reset when it is determined to proceed with another password entry process for that round of password entry.

5. The multi-touch method of claim 2, wherein a storage algorithm is used for storing and registering the password.

6. The multi-touch method of claim 2, wherein each of the first and the second images comprises characters, numbers, or figures.

7. A multi-touch device comprising a touch panel, the touch panel is configured to:
    set a plurality rounds of password entry, each of the plurality of rounds of password entry comprising:
        provide a first image and a second image;
        determine a first object is touching the first image on the touch panel;
        determine whether or not a second object is touching the second image on the touch panel when the first object is touching the first image,
        if determines that the second object is touching the second image when the first object is touching the first image, when the first object and the second object are removed from the touch panel, use the first image and the second image as the password entry of that round of password entry and end that round of password entry;
        if determines that the second object is not touching the second image when the first object is touching the first image, when the first object is removed from the touch panel, use the first image as the password entry of that round of password entry; and
        end that round of password entry and proceed to the next round of the plurality rounds of entry;
    perform each of the plurality rounds of password entry;
    after completing the plurality rounds of password entry, combine password entries from each of the plurality rounds of password entry, to form a complete password entry; and
    perform a password authentication process on the complete password entry.

8. The multi-touch device of claim 7, wherein the touch panel is further configured to, after the first object and the second object are removed from the touch panel, or after the first object is removed from the touch panel:
    make an evaluation to determine whether or not to proceed with another password entry process for that round of password entry, if not, perform the password confirmation process for confirming that round of password entry.

9. The multi-touch device of claim 8, wherein when that round of password entry is confirmed to be correct, the touch panel is further configured to store and register that round of password entry, otherwise, the touch panel is further configured to receive input again for that round of password entry.

10. The multi-touch device of claim 8, wherein the touch panel is further configured to, when the touch panel determines to proceed with another password entry process for that round of password entry:

reset that round of password entry that is achieved.

11. The multi-touch device of claim 8, wherein the touch panel is further configured to use a storage algorithm for storing and registering the password.

12. The multi-touch device of claim 8, wherein each of the first and the second images comprises characters, numbers, or figures.

* * * * *